UNITED STATES PATENT OFFICE.

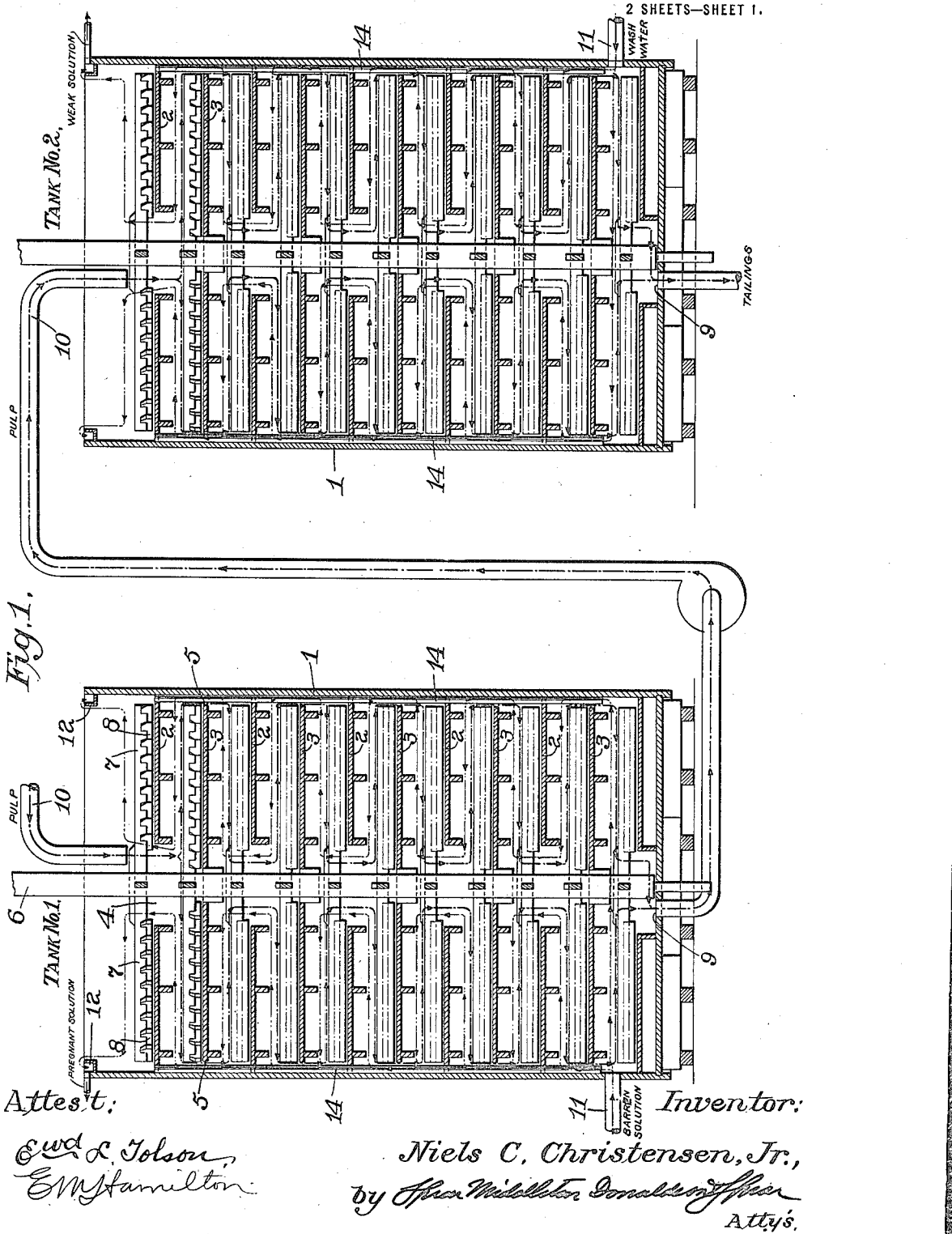

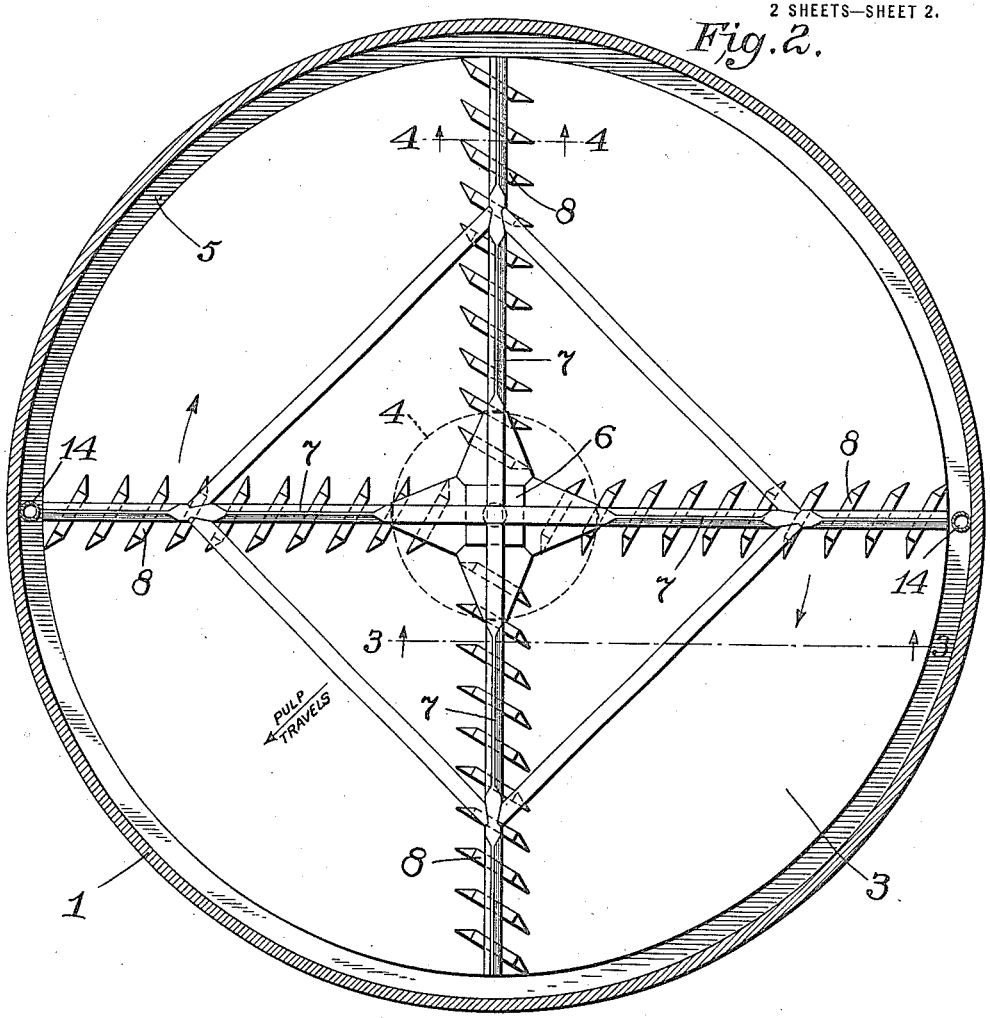
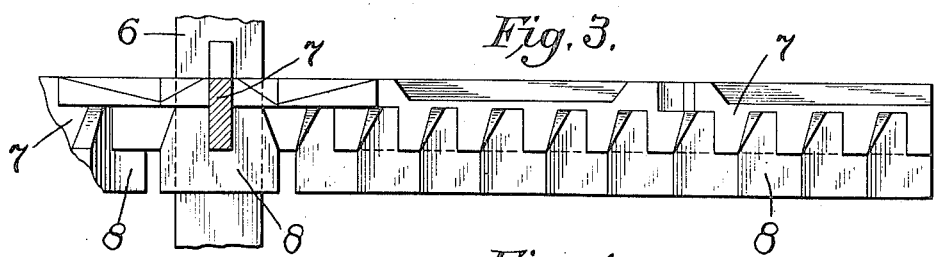
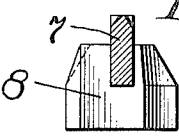

NIELS C. CHRISTENSEN, JR., OF SALT LAKE CITY, UTAH, ASSIGNOR, BY MESNE ASSIGNMENTS, TO HOLT-CHRISTENSEN PROCESS COMPANY, OF SALT LAKE CITY, UTAH, A CORPORATION OF UTAH.

APPARATUS FOR TREATING ORES AND THE LIKE.

1,231,707.     Specification of Letters Patent.     Patented July 3, 1917.

Application filed March 30, 1915. Serial No. 18,094.

*To all whom it may concern:*

Be it known that I, NIELS C. CHRISTENSEN, Jr., citizen of the United States, residing at Salt Lake City, Utah, have invented certain new and useful Improvements in Apparatus for Treating Ores and the like, of which the following is a specification.

This invention relates to certain new and useful improvements in apparatus for and processes of extracting soluble material in solution from non-soluble residue or for the separation of liquids or solutions from solids. It is applicable to many of the leaching or lixiviating processes in the field of metallurgy or industrial chemistry, etc., and to some of the problems met in civil engineering.

In the field of metallurgy, the invention is applicable to leaching processes for sands or slimes or both, and to acid or non-acid processes. A large field of application is in the cyanid process where it may be used to great advantage for the treatment of sand or slime or both together. A new field of application is in the acid leaching processes now being developed for copper ores and the chloridizing salt acid leaching process for the treatment of mixed ores of gold, silver, copper and lead. In these processes the apparatus serves as a leaching, agitating, replacing and clarifying machine, thus advantageously combining many processes now carried out in separate machines.

In the field of industrial chemistry an example of its possible application is in the washing of beet pulp, etc. Many other applications in this field might be mentioned.

In civil or sanitary engineering the invention may be used in the treatment of sewage, etc.

The applications of the invention in these fields are so many that the descriptions will be made in a general way to a leaching process, a washing or replacing process and a thickening or separating process.

Among the objects of the invention are to provide a simple, economical and efficient method, and apparatus for carrying out said method, and the invention includes the novel steps and features of construction defined by the appended claims, my invention being clearly set forth in the following description wherein reference is had to the accompanying drawings in which—

Figure 1 is a sectional elevation of my improved apparatus;

Fig. 2 is a transverse section through one of the tanks;

Fig. 3 is a sectional detail on line 3—3 of Fig. 2;

Fig. 4 is a similar view on line 4—4 of Fig. 2.

Referring by reference characters to this drawing, 1 indicates a stationary cylindrical tank in which the stationary, horizontal decks (2) and (3) are disposed at suitable distances from each other. The decks (2) have a circular opening (4) at the center and the alternate decks (3) have an opening or openings (5) at the periphery. The revolving central shaft (6) supports two or more rabble arms (7), which carry the plows (8). These plows or rabbles (8) are so arranged as to move the solid material from the center toward the periphery upon the decks (3) and from the periphery toward the center upon the decks (2). The plows upon the lowest arm move the material upon the tank bottom or false deck or false bottom toward the central discharge opening (9). The pulp or ore is fed into the machine from the pipe (10). The solution or wash water is fed into the tank by a suitably disposed pipe or pipes (11). The clarified solution overflows from the launder (12). The spacing, arrangement and number of decks will vary with the particular application of the apparatus as will also the number of arms and plows and of the speed of their rotation. The pipes (10) may be arranged to discharge the ore upon the first or second decks as desired in the particular process in question. The pipe or pipes (11) may be arranged to deliver the solution at any desired point or points in the lower part of the machine.

In a cyanid or acid leaching process the operation in general would be as follows:

The ore or pulp is fed onto the second deck from the pipe or spout (10) in a fairly continuous and uniform stream. The required amount of barren solution is fed into the lower part of the machine from the pipes (11) in the same manner. The rabbles or plows (8) move the ore from the center to the periphery upon the decks (3) and in the opposite direction upon the decks (2) thus dropping the ore from deck to deck and finally discharging it through the opening (9) along with the desired amount of barren solution. In passing through the machine the ore is agitated and leached and the counter current of ore and solution gives a continuous replacement of richer solution with more barren solution. As the rich solution passes out over the upper deck, the slimes are settled out and the clear pregnant solution overflows from the launder (12). If the slimes do not settle rapidly the rabbles move the slime which settles upon the upper deck to the periphery where it is discharged through the pipes (14) to one of the lower decks. If the slimes settle readily they are discharged through the central opening in the upper deck down upon the second deck and passed down through the machine with the remainder of the ore. The barren leached ore from tank No. 1 is now carried to tank No. 2, where it passes through the same cycle except that in this case wash water is supplied through the pipe (11). The ore is thoroughly washed in passing down through the machine and the tailings discharged from the opening (9) with the required amount of wash water. As in tank No. 1, this tank acts as an agitating, replacing and clarifying machine in which the barren solution carried over with the ore from tank No. 1 is replaced by the wash water. As is readily seen from the above brief description, the apparatus acts as a leaching, agitating, replacing and clarifying machine. It secures an efficient counter current of ore and solution and delivers a clear, pregnant solution and washed tailings without the use of different machines for agitating, thickening and clarifying and washing and filtering.

If the apparatus is to be used for a dissolving, washing or replacing process only one tank may be used as follows:

The pulp is fed into the machine through the pipe (10) and the wash water or wash solution through the pipe (11). The rabbles move the pulp across the decks and down through the machine as previously described and the counter current of solution passing through the machine dissolves or washes out the soluble material or replaces the solution in the pulp as is desired in each particular case. Any slimes which settle upon the upper deck are treated as previously described. As in the former description clear solution passes out through the overflow launder (12), and the washed pulp is discharged with the desired amount of wash water or solution from the opening (9). As is readily seen, a dissolving, or washing, or replacing process is carried out very efficiently by this machine which delivers a clear liquid solution and a washed pulp without the use of special apparatus for agitating or filtering or clarifying.

If the process is for separating solution or water from pulp or for thickening of the dilute pulp only one machine may be used as follows:

The dilute pulp is fed into the machine through the pipe (10) or at any other place which may be found advantageous in the particular case in question. No solution or wash water is admitted. The pulp settles upon the decks and is carried down to the discharge opening as previously described, and the clear solution overflows from the launder (12).

Many variations from the above description may be made to suit the conditions which arise in each particular application of the invention, and I therefore do not desire to be limited by the above brief description, but rather by the spirit of the invention as outlined and the appended claims.

Having thus described my invention what I claim is:

1. An apparatus for leaching and sedimentation, which comprises a vertical cylindrical tank having a central discharge opening in the bottom and an overflow rim launder at the top and with a series of stationary horizontal decks disposed one above another therein, alternates of said decks being opened respectively at the center and at the periphery, pipes connecting openings in the periphery of the upper deck with the space above one of the lower decks, in said tank a central vertical revolving shaft supplied with arms carrying rabbles above each deck and above the tank bottom, and so arranged as to move the material upon said deck to the above mentioned discharge openings, means for feeding ore and other substances into the upper part of the tank, and means for feeding solution into the lower part of the tank.

2. An apparatus for leaching and sedimentation which comprises a vertical cylindrical tank having a central discharge opening in the bottom and an overflow rim launder at the top, and a series of stationary horizontal decks disposed one above another therein, alternates of said decks being opened respectively at the center and at the periphery, a central vertical revolving shaft supplied with arms carrying rabbles above each deck and above the tank bottom and so arranged as to move the material upon said decks to the above mentioned openings in said decks and discharge said material upon the decks below and finally discharge said material through the above mentioned discharge openings, and means for feeding ore and other substances into the upper part of the tank.

3. An apparatus for leaching and sedimentation comprising a vertical cylindrical tank having a central discharge opening in the bottom and an overflow rim launder at the top and with a series of stationary horizontal decks disposed one above another therein, alternates of said decks being open respectively at the center and at the periphery, pipes connecting openings in the periphery of the upper deck with the space above one of the lower decks, a central vertical revolving shaft supplied with arms carrying rabbles above each deck and above the tank bottom, and so arranged as to move the material upon said decks to the above mentioned openings in said decks and discharge said material upon the decks below and finally discharge said material through the above mentioned discharge openings, and means for feeding ore and other substances into the upper part of the tank.

In testimony whereof, I affix my signature in presence of two witnesses.

NIELS C. CHRISTENSEN, Jr.

Witnesses:
G. L. DAVIS,
H. E. SMITH.